(12) United States Patent
Staiger

(10) Patent No.: US 6,226,967 B1
(45) Date of Patent: May 8, 2001

(54) CONVEYOR FOR LAWN MOWER

(75) Inventor: Jürgen Staiger, Königsfeld-Erdmannsweiler (DE)

(73) Assignee: Horst Staiger & Sohne GmbH (DE)

( * ) Notice: Subject to any disclaimer, the term of this patent is extended or adjusted under 35 U.S.C. 154(b) by 0 days.

(21) Appl. No.: 09/184,735

(22) Filed: Nov. 2, 1998

(30) Foreign Application Priority Data

Nov. 3, 1997 (DE) .............................................. 197 49 960

(51) Int. Cl.⁷ .................................................. A01D 34/00
(52) U.S. Cl. .............................................. 56/14.5; 56/16.6
(58) Field of Search .............................. 56/14.5, 16.4 R, 56/16.6, 345, 477; 198/620, 626.1, 626.2, 626.3, 626.4, 626.5, 626.6, 607

(56) References Cited

U.S. PATENT DOCUMENTS

| | | | |
|---|---|---|---|
| 1,387,680 | | 8/1921 | Baker . |
| 2,338,932 | | 1/1944 | Grant ........................................ 56/60 |
| 3,754,388 | * | 8/1973 | Neely, Jr. ................................. 56/346 |
| 3,942,307 | * | 3/1976 | Quick ....................................... 56/14.5 |
| 4,262,475 | * | 4/1981 | Takahashi et al. ....................... 56/202 |
| 4,382,471 | * | 5/1983 | Peterson .................................. 56/16.4 |
| 4,722,175 | * | 2/1988 | Hobhouse ............................. 56/328.1 |
| 5,083,417 | * | 1/1992 | Jeronimidis et al. ........................ 56/9 |
| 5,293,733 | * | 3/1994 | Rosenkoetter .......................... 56/16.6 |
| 5,848,521 | * | 12/1998 | Kobayashi .............................. 56/202 |
| 5,964,081 | * | 10/1999 | Ingram ................................... 56/14.5 |

FOREIGN PATENT DOCUMENTS

| | | | |
|---|---|---|---|
| 202 143 | | 9/1908 | (DE) .......................................... 45/36 |
| 90 05 367 | | 10/1990 | (DE) .............................. A01D/34/76 |
| 0 122 903 | | 10/1984 | (EP) ............................. A01D/35/264 |
| 2 512 632 | | 3/1983 | (FR) .............................. A01D/84/00 |
| 2 751 167 | | 1/1998 | (FR) .............................. A01D/87/02 |
| 418677 | * | 10/1934 | (GB) ................................. 198/626.4 |
| 478505 | | 6/1937 | (GB) . |
| 2019706 | | 11/1979 | (GB) .............................. A01D/35/26 |
| 554186 | * | 5/1977 | (SU) ..................................... 198/626 |

* cited by examiner

*Primary Examiner*—Robert E. Pezzuto
*Assistant Examiner*—Nathan Mammen
(74) *Attorney, Agent, or Firm*—Pendorf & Cutliff

(57) ABSTRACT

For conveyance of mowed material a conveyor device comprised of a conveyor belt (26) is employed between the mowing mechanism and collection container. The conveyor belt (26) is comprised of two equally paced oppositely driven endless conveyor belts, which run about drive (40, 44) and guide rollers (36, 46), which are mounted on horizontal axles (41, 47, 53). The conveyor belts (32, 34) exhibit two conveyor segments (56, 58) which are parallel and lie opposite to each other, which in the absence of mowed material to be conveyed (22) lie against each other, which receive mowed material (22) from the mowing mechanism (14) and of which the spacing with respect to each other can be increased by the mowed material (22) and of which their respective separation is increased by the spreading force of the mowed material (22) against the spring force (54).

6 Claims, 2 Drawing Sheets

CONVEYOR FOR LAWN MOWER

BACKGROUND OF THE INVENTION

1. Field of the Invention

The invention concerns a conveyor for lawn mowers.

2. Description of the Related Art

With known lawn mowers the material cut by the mowing device is most often conveyed by means of a turbine blower or the like through a conveyance canal and blown out into a capturing container, grass capturing basket or the like. These conveyance means are associated with a significant noise production, which is considered to be very disturbing. Besides this, the conveyance means is not particularly large and stoppages can occur in the conveyance canal due to the cut material. The same applies for conveyor and collection devices for other loose material, such as sweeping machines or the like.

From DE 29 03 497 A1 a lawnmower is known, in which the oppositely lying conveyor belt sections enclose an acute angle, wherein they have a relatively large separation at the entry side, while at the exit side they contact each other linearly. The entering mowed material is strongly pressed in a cleft between the conveyor belt segments as they move towards each other in the direction of movement, which leads to a higher load on the conveyor belts by the pressed together mowed material. If the mowed material additionally contains blocking material, such as rocks or the like, or if it in conditions of high moisture strongly agglomerates or forms clumps, then there can occur blockages or damage to the conveyor belt system.

SUMMARY OF THE INVENTION

The present invention improves the conveyance device of the above discussed type such that during operation it hardly produces noise, makes possible a large through-put for cut material and in which stoppages of the conveyance device due to the cut material practically does not occur.

The conveyor belt employed in accordance with the invention operates particularly quietly, in particular since it need only be driven at a low speed in order to transport the received cut material or other material to the capturing container. As a result of the relatively slow progress of the conveyor belt there occurs also only a very small danger of accident or injury during use of the same. In the area of the actual conveyor section of the two conveyor belts these are pressed against each other under tension, so that when operated empty without conveying cut material they lie against each other. As soon as cut material arrives at the entry side of the conveyor belt sections, the conveyor belt sections are spread apart by the entering cut material and convey the cut material between them to the exit side of the conveyor belt sections, at which time it enters into the capture container. In the case that obstructive types of objects, stones or the like, are contained in the cut material, it is possible for the conveyor belts to give way at any time without blockage of the conveyor system. A further advantage of the employment of the inventive conveyor belt is to be seen therein, that during the passing of the cut material through the conveyor belt sections a spring like pressing is exercised upon the cut material, whereby any water in the cut material is pressed out and runs downwards. Thereby the cut material arrives comparatively dry and compacted at the capture container, which as a result can receive more cut material.

The inventive conveyor belt can be employed, as discussed, not only in lawn mowers, but rather also for conveyance and compacting of other loose material, for example from sweepings taken up by a sweeping machine.

The advantageous embodiments of the invention concern the spring tensioned mounted of one conveyor belt with respect to the other and the effective or practical embodiments of the drive of the conveyor belt and the belt itself.

The relative arrangement of conveyor belt and capturing device has the advantage that a supplemental pressing process is produced for the cut material deposited in the capturing container, since the capturing container is in this case filled in layers from the bottom upwards, wherein the upper layers respectively press against the lower layers.

Supplemental advantages result from the reversibility of the drive direction of the conveyor belt, for example during a blockage occurring despite the spring tensioned provision of the one conveyor belt or for simultaneous mulching during the mowing process, whereby the cut material can be emitted either out of the lower side of the mower housing or out of the ventilation canal of the same.

BRIEF DESCRIPTION OF THE DRAWINGS

An advantageous embodiment of the invention is described in greater detail by reference to the figures. There are shown.

DETAILED DESCRIPTION OF THE INVENTION

Figure 1:
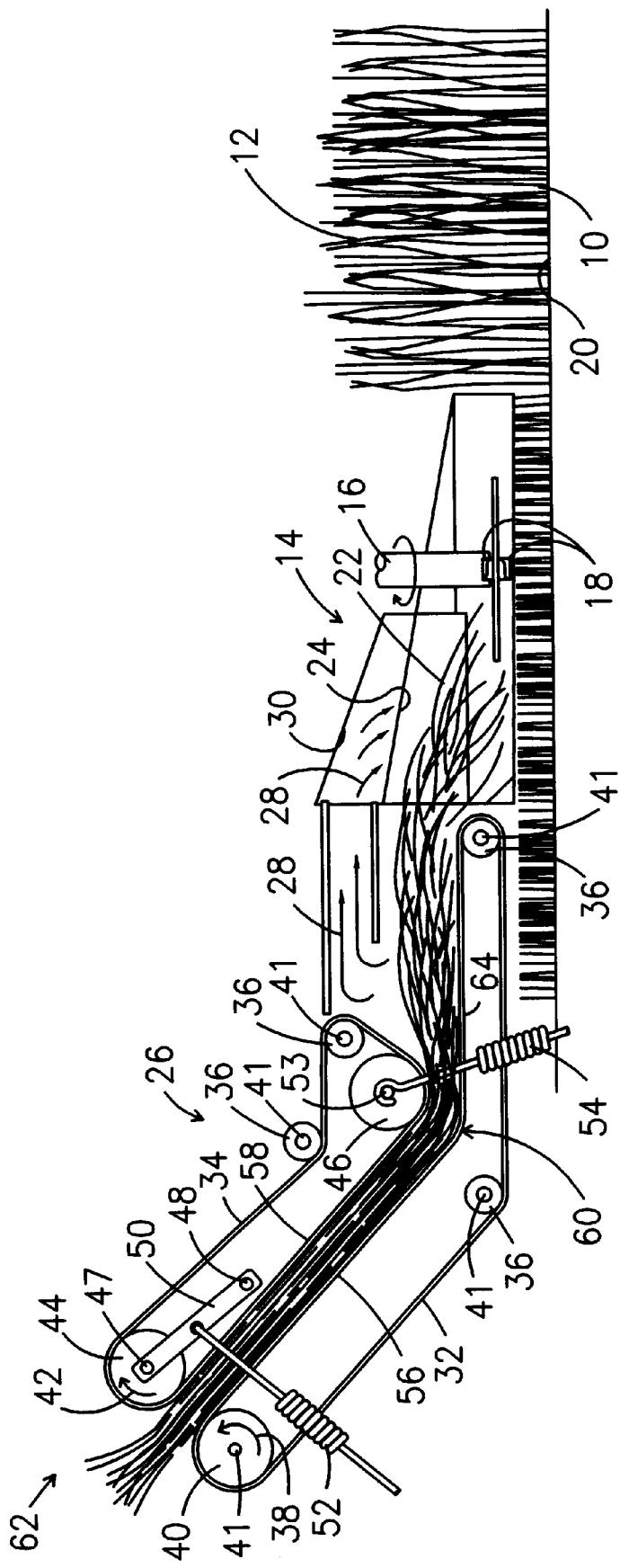
FIG. 1 a schematic side view of a mower mechanism and conveyor belt of a lawn mower in operation, wherein the side wall of the conveyor belt is opened and the capturing container as well as corresponding covering housing parts are omitted, and FIG. 2 a side view corresponding to FIG. 1 during empty operation of the lawn mower in a slightly enlarged scale in comparison to FIG. 1.

In FIG. 1 the lawn mower is shown in the process of mowing lawn material 12 extending upwards from the ground 10. The mowing mechanism, generally designated with 14, is maintained at a set height above the ground 10 shown in FIG. 1 by not shown wheels of the lawn mower, so that the cutting blade 18 driven via a drive shaft 16 cuts the lawn material 12 at approximately a cutting height 20. The mowed material 22 is transported by a towards backwards widening conveyance canal 24 to the conveyor belt, generally designated with reference number 26. The air transported with the mowed material 22 to the conveyor belt 26 is removed towards the front according to arrow 28 through a vent canal 30 of the housing.

The conveyor 26 is comprised of two circulating endless conveyor belts, and more particularly, a lower conveyor belt 32 and an upper conveyor belt 34. Both conveyor belts run over fixed guide rollers 36. The lower conveyor belt 32 runs in addition about a fixed drive roller 40 rotationally driven in the sense of the arrow 38 and in frictional contact with the conveyor belt 32, in a manner not shown in greater detail, while the upper conveyor belt 34 runs via a moveably mounted and in the sense of the arrow 42 driven drive roller 44 and a moveably mounted guide roller 46. The fixed guide rollers 36 and the fixed drive rollers 40 are respectively rotatably mounted on fixed horizontal axles 41. The axle 47 of the drive roller 44 is mounted moveably via a swing lever 50, the other end 48 of the swing lever being fixed to the housing, and via a pull spring 52 connected to a fixed point on the housing in manner not shown in greater detail. The axle 47 and therewith the moveable drive roller 44 is thereby drawn against the fixed lower drive roller 40. In similar manner the axle 53 of the moveable guide roller 46 of the upper conveyor belt 34 is connected via a pull spring 54 in not greater detail shown manner with a fixed point of the housing. Thereby it is pulled against the lower conveyor belt 32.

Figure 2:
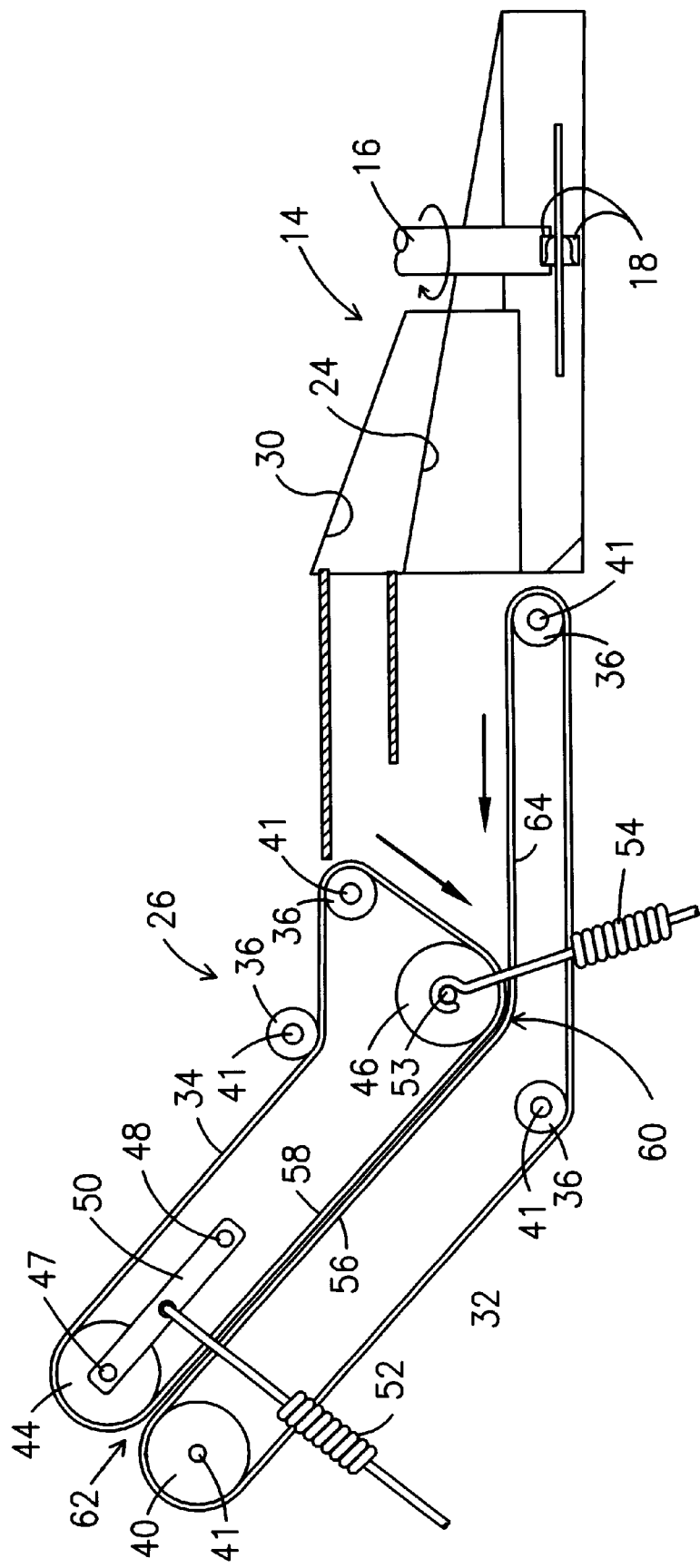

The pretensioning of the upper conveyor belt 34 produced by the two draw springs 52 and 54 produces during operation while empty, that is, without input of mowed material, a lying against of the two conveyor belts 32 and 34 respectively in the conveyor sections 56 and 58 between the moveable guide rollers 46 and the two drive rollers 40 and 44. As soon as mowed material 22 arrives at the input side 60 of the conveyor belt sections 56 and 58 the moveable guide roller 46 is urged upwards against the force of the draw springs 54 and the mowed and pressed material 22 entering between the two conveyor sections 56 and 58 is pushed upwards. The mowed material 22 is conveyed between the conveyor sections 56 and 58 of the two conveyor belts 32 and 34 up to the exit end 62 of the conveyor sections 56 and 58 formed by the drive rollers 40 and 44 and there exits to a not shown collection container, of which the floor is as positioned as far as possible below the upward end 62 of the conveyor sections 56, 58. In the same manner as the moveable guide roller 46, the moveable drive roller 44 is also urged towards upwards out of the position of FIG. 2 into the position of FIG. 1 against the force of the draw spring 62, so that the mowed material is conveyed under suitable spring pressure from entry end 60 to exit end 62 of the conveyor sections 56 and 58.

The lower conveyor belt 32 exhibits immediately adjacent to the mowing mechanism 14 a horizontal collection section 64, through which the mowed material 22 exiting from the mowing mechanism 14 is loosely conveyed to the input side 60 of the conveyor sections 56 and 58.

What is claimed is:

1. A lawn mower for conveying a cut material between a mowing mechanism and a collection container of a lawn mower, comprising in combination:

A) a collection container;

B) a mowing mechanism maintained at a set height above the ground;

C) a conveyor device for conveying said cut material between a conveyance channel and the collector container, said conveyor device including:
    1) two equally spaced oppositely driven endless conveyor belts to receive said cut material between them from the moving mechanism;
    2) a pair of drive rollers to run said pair of endless conveyor belts; and
    3) a pair of guide rollers mounted on a horizontal axle to guide said pair of endless conveyor belts;
    wherein the conveyor belts run parallel to each other and in the absence of said cut material lie against each other;
    wherein the space between the conveyor belts relative to each other can be increased by the cut material acting against a compression force exercised upon said conveyor belt by a spring;

D) a conveyance channel for transporting the mowed material between the mowing mechanism and the conveyor device; and E) a vent channel having an inlet and an outlet above the conveyance channel for removing air transported with the mowed material and to return air removed from the outlet back to the inlet.

2. A lawn mower according to claim 1, wherein said endless conveyor belts can be driven in reversible direction.

3. A lawn mower for conveying mowed material between a mowing mechanism and a collection container of a lawn mower, comprising in combination:

A) a collection container;

B) a mowing mechanism maintained at a set height above the ground;

C) a conveyor device for conveying cut material between a conveyance channel and the collector container, including:
    a) a lower endless conveyor belt;
    b) first and second lower conveyor belt fixed guide rollers;
    c) a fixed drive roller in frictional contact with the lower conveyor belt;
    d) an upper endless conveyor belt;
    e) a fixed upper conveyor belt guide roller;
    f) a moveable upper conveyor belt drive roller, oppositely driven to the lower conveyor belt;
    g) a moveable upper conveyor belt guide roller;
    h) a swing lever with a first end fixed to the moveably driven roller of the upper conveyor belt and the second end fixed to a housing;
    i) a pull spring connected to the second end of the swing lever to a fixed point on the housing, for pulling the moveable upper conveyor belt drive roller against the fixed drive roller;
    j) a second pull spring connected to the moveable guide roller of the upper conveyor belt to the housing, for pulling the upper conveyor belt against the lower conveyor belt and compacting the cutting material;

D) a conveyance channel for transporting the mowed material between the mowing mechanism and the conveyor device; and E) a vent channel having an inlet and an outlet above the conveyance channel for removing air transported with a mowed material and to return air removed from the outlet back to the inlet.

4. A lawn mower according to claim 3, wherein the drive direction of the upper endless conveyor belt and the lower endless conveyor belt are reversible.

5. A lawn mower according to claim 3, wherein the upper conveyor belt lies against the lower conveyor belt when in the absence of the mowed material.

6. A lawn mower according to claim 3, wherein the separation between the upper conveyor belt and the lower conveyor belt is increased by the mowed material acting against a compression force produced by the second pull spring.

* * * * *